United States Patent
Bertsch et al.

(10) Patent No.: US 10,289,915 B1
(45) Date of Patent: *May 14, 2019

(54) MANUFACTURE OF IMAGE INVENTORIES

(71) Applicant: Eight Plus Ventures, LLC, Santa Monica, CA (US)

(72) Inventors: Christoph Bertsch, Pacific Palisades, CA (US); Rodney Lake, Santa Monica, CA (US); Douglas Sturgeon, Half Moon Bay, CA (US); Anthony Sziklai, Oak Park, CA (US)

(73) Assignee: Eight Plus Ventures, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,410

(22) Filed: Jun. 5, 2018

(51) Int. Cl.
*G06K 9/00* (2006.01)
*G06F 16/48* (2019.01)
*H04L 9/06* (2006.01)
*G06T 1/00* (2006.01)

(52) U.S. Cl.
CPC ......... *G06K 9/00744* (2013.01); *G06F 16/48* (2019.01); *G06K 9/00362* (2013.01); *G06T 1/0021* (2013.01); *H04L 9/0643* (2013.01); *G06T 2207/10004* (2013.01)

(58) Field of Classification Search
CPC ............ G06K 9/00744; G06K 9/00362; G06T 1/0021; G06T 2207/10004; H04L 9/0643; G06F 17/30038
See application file for complete search history.

(56) References Cited

U.S. PATENT DOCUMENTS

| | | | |
|---|---|---|---|
| 7,209,571 B2 | 4/2007 | Davis et al. | |
| 7,668,869 B2* | 2/2010 | Weinberger | G06F 16/78 707/741 |
| 8,494,231 B2* | 7/2013 | Folta | G06K 9/00295 382/118 |
| 9,690,967 B1 | 6/2017 | Brundage et al. | |
| 2002/0146123 A1 | 10/2002 | Tian | |
| 2004/0153649 A1 | 8/2004 | Rohads et al. | |
| 2005/0010792 A1 | 1/2005 | Carpentier et al. | |
| 2006/0103736 A1* | 5/2006 | Obrador | G06T 1/20 348/222.1 |
| 2006/0130118 A1* | 6/2006 | Damm | H04L 63/0245 725/135 |

(Continued)

OTHER PUBLICATIONS

Ando et al. Image Recognition Based Digital Watermarking Technology for Item Retrieval in Convenience Stores, Journal, Feature Articles: Creating New Services with corevo-NTT Group's Artificial Intiligence Technology, vol. 15 No. 8, published Aug. 2017, 6 pages.

(Continued)

*Primary Examiner* — Linglan E Edwards
(74) *Attorney, Agent, or Firm* — SoCal IP Law Group LLP; Steven C. Sereboff

(57) ABSTRACT

There are disclosed methods and apparatus for manufacture of image inventories. A frame slicing and packaging machine assigns metadata to each frame of a digital video work. It then detects objects in each frame's image, recognizes the objects and assigns metadata to the objects. The machine then generates a cryptographic hash of the frame's image. Lastly, the machine writes the hash to a node of a transaction processing network.

28 Claims, 4 Drawing Sheets

(56) References Cited

U.S. PATENT DOCUMENTS

| | | | |
|---|---|---|---|
| 2007/0061895 A1 | 3/2007 | Ceraolo et al. | |
| 2008/0049971 A1 | 2/2008 | Ramos et al. | |
| 2008/0127270 A1* | 5/2008 | Shipman | G06F 17/30843 |
| | | | 725/46 |
| 2008/0228733 A1 | 9/2008 | Davis et al. | |
| 2008/0243898 A1* | 10/2008 | Gormish | G06F 21/64 |
| 2010/0059380 A1 | 3/2010 | Rohads et al. | |
| 2010/0080471 A1 | 4/2010 | Haas et al. | |
| 2010/0309226 A1 | 12/2010 | Quack | |
| 2012/0106806 A1* | 5/2012 | Folta | G06K 9/00295 |
| | | | 382/118 |
| 2013/0003126 A1 | 1/2013 | Van Osdol et al. | |
| 2014/0049653 A1 | 2/2014 | Leonard et al. | |
| 2014/0214885 A1* | 7/2014 | Park | G06F 16/783 |
| | | | 707/769 |
| 2014/0331137 A1* | 11/2014 | McKoen | G10L 15/265 |
| | | | 715/719 |
| 2015/0100578 A1 | 4/2015 | Rosen et al. | |
| 2015/0172787 A1 | 6/2015 | Geramifard | |
| 2016/0285631 A1 | 9/2016 | Deleeuw | |
| 2016/0342937 A1 | 11/2016 | Kerrick | |
| 2017/0140346 A1 | 5/2017 | Whitehouse | |
| 2017/0243179 A1 | 8/2017 | Dehaeck | |
| 2018/0046889 A1 | 2/2018 | Kapinos et al. | |
| 2018/0121635 A1* | 5/2018 | Tormasov | G06F 21/645 |
| 2018/0253567 A1 | 9/2018 | Gonzalez-Banos et al. | |
| 2018/0257306 A1 | 9/2018 | Mattingly et al. | |

OTHER PUBLICATIONS

Cryptoart, "Cryptoart is like a piggy bank. Each art piece physically stores Bitcoin. Each art piece also includes an easy 3-step guide to understanding Bitcoin", online article, https://cryptoart.com/how-cryptoart-works/, last accessed Jul. 25, 2018, 3 pages.

R.A.R.E., A new age platform for collecting unique, scarce digital art, cultivating the next generation of artists and collectors, https://www.rareart.io/#How-RARE-Works, last accessed Jul. 25, 2018, 6 pages.

* cited by examiner

MANUFACTURE OF IMAGE INVENTORIES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to digital image processing.

Description of the Related Art

A movie is a collection of still images that are shown one after the other in quick succession. When the images are viewed in quick succession (approximately 24 images per second), the human brain interprets the images as a motion picture or movie. Therefore, a traditional movie that is shown in theaters is a display of images in quick succession on the order of approximately 24 images per second, or 129,600 images for a 90-minute movie (24 images per second×60 seconds per minute×90 minutes). Movies made in non-digital (e.g., photographic film) media can be converted to digital format, and the converted movies as well as movies originally made in digital format can have individual images extracted from the master digital media file.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
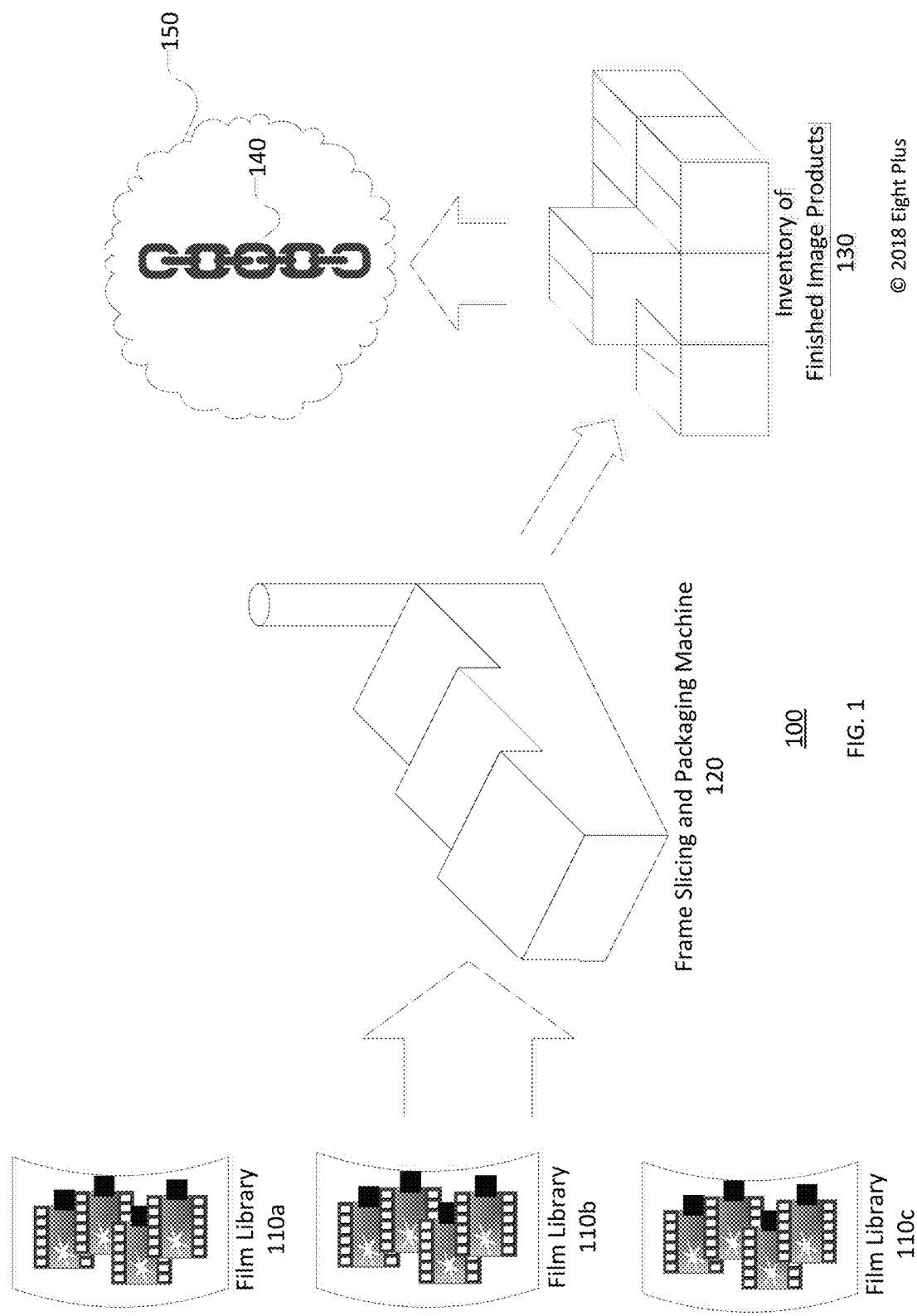
FIG. 1 is a block diagram of a system for production of image inventories.

Referring now to FIG. 1 there is shown a block diagram of a system 100 for production of image inventories. The system 100 includes one or more film libraries 110a, 110b, 110c, a frame slicing and packaging machine 120, an inventory of finished image products 130, and transaction processing nodes 140.

The film libraries 110a, 110b, 110c each includes a collection of one or more whole movies, videos, and/or movie trailers, and/or portions thereof (e.g., clips), each of which is a sequence of frames having a respective still image. These items in a film library will be referred to herein as a base work. A base work may be a single frame, i.e., a still image, such as a picture or a drawing, in analog or digital format. The base works may be in analog or digital format, and each film library 110a, 110b, 110c may be exclusive to a particular form or format of base work. Some film libraries may have base works in assorted forms and/or formats, related or unrelated. The frames of a base work may have various objects, such as people, animals, goods physical structures or text in a frame. A given frame may include audio and subtitles.

Figure 2:
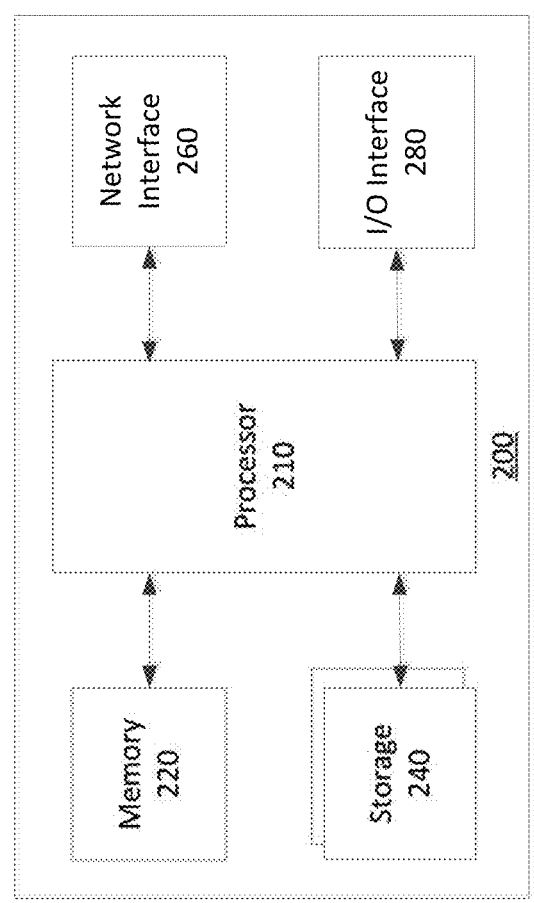
FIG. 2 is a block diagram of a computing device.
Figure 4:
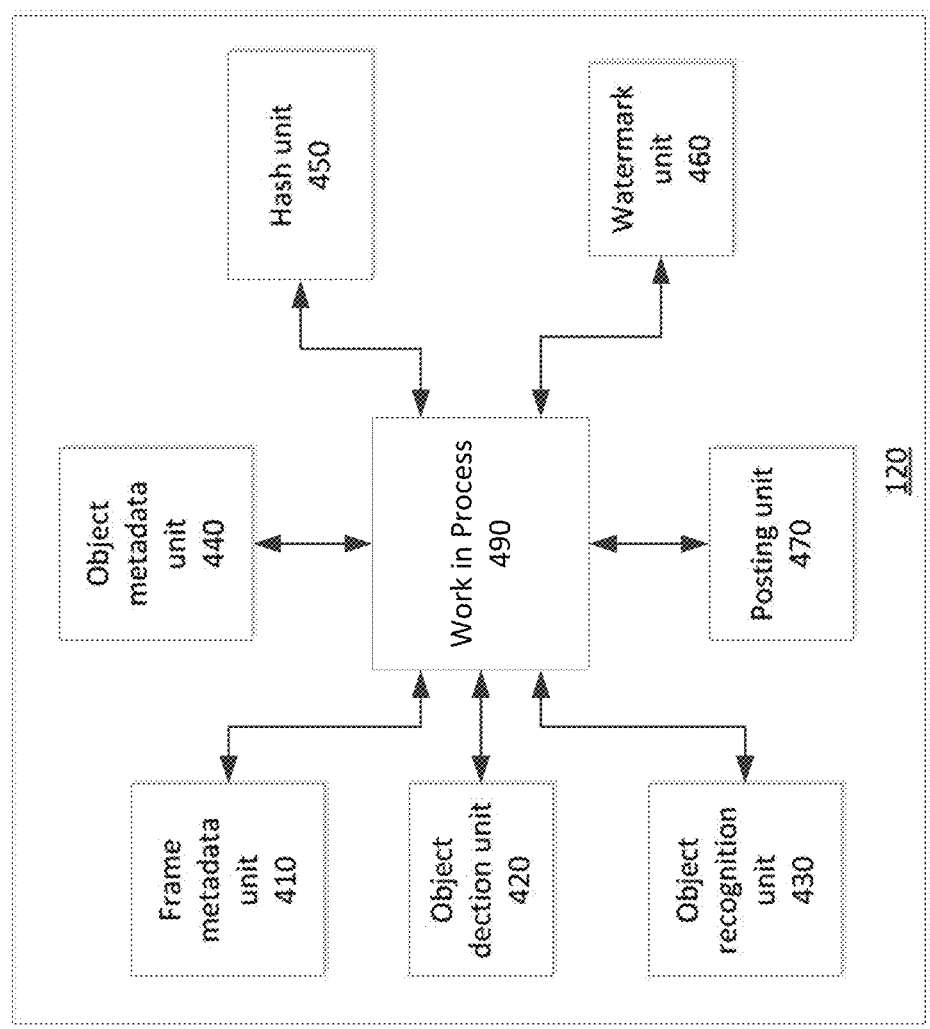
FIG. 4 is a block diagram of a frame slicing and packaging machine.

The frame slicing and packaging machine 120 produces the inventory of finished image products 130 and moves them into the transaction processing nodes 140. The frame slicing and packaging machine 120 may be a computer system, such as shown in FIG. 2, including one or more non-volatile machine readable media storing a program having instructions which when executed by a processor will cause the processor to produce the inventory of finished image products 130. As shown in FIG. 4, the frame slicing and packaging machine 120 may include a frame metadata unit 410, an object detection unit 420, an object recognition unit 430, an object metadata unit 440, a hash unit 450, a watermark unit 460, a posting unit 470. These units 410, 420, 430, 440, 450, 460, 470 interact with a work in process subsystem 490, which may be the storage 240 (FIG. 2). The posting unit 470 may effectuate its work through the I/O interface 280 (FIG. 2).

Artificial intelligence may be incorporated into or used by the frame metadata unit 410, the object detection unit 420, the object recognition unit 430 and/or the object metadata unit 440. Accordingly, these units 410, 420, 430, 440 may be trained to perform the corresponding work prior to going into production. These units 410, 420, 430, 440 may employ quality assurance, such as use of human checks on samples of the production output, which may be used as feedback for refinement of the training.

Each finished image product in the inventory 130 is a chattel good, capable of transfer on an individual basis.

The transaction processing nodes 140 may be in an information technology cloud 150, such as cloud storage. The transaction processing nodes may be in a blockchain.

Description of Processes

Figure 3:
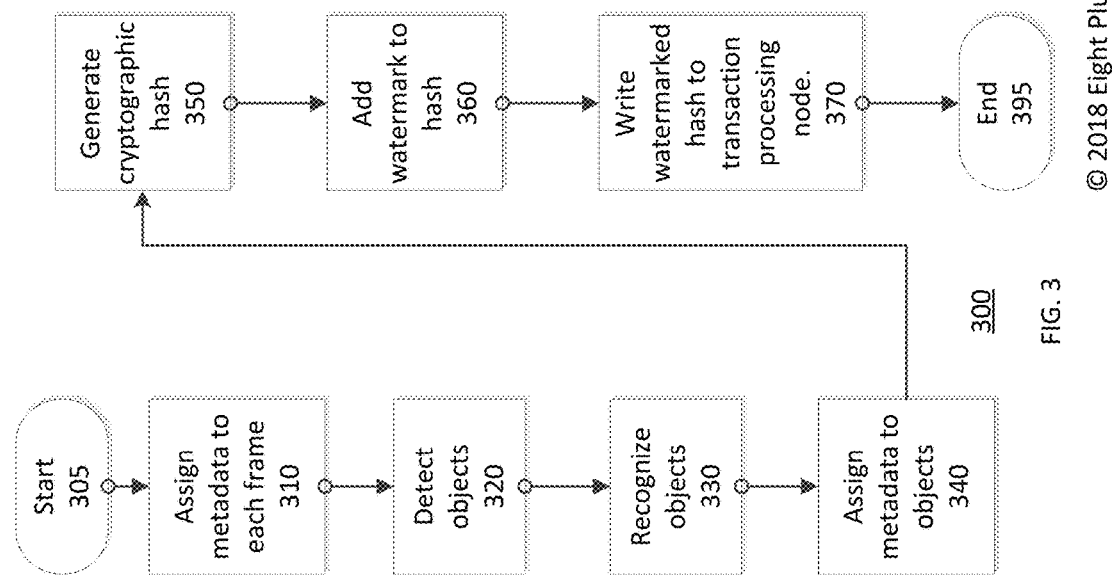
FIG. 3 is a flowchart of a process for production of image inventories.

Referring now to FIG. 3 there is shown a flowchart 300 of a process for production of image inventories. The process 300 may be performed by the frame slicing and packaging machine 120 of FIG. 1 and FIG. 4, having as inputs the film libraries 110a, 110b, 110c, etc. and manufacturing the inventory of finished image products 130. The flow chart 300 has both a start 305 and an end 395, but the process is cyclical in nature.

After starting 305, the process may include some preprocessing. This preprocessing may include extraction of base works from the film libraries into the work in process subsystem 490, and extraction of frames from a base work. The base work may be on an analog physical medium such as celluloid film, and preprocessing may include scanning the analog film medium into a digital file. If the base work is in analog form it may be converted to digital form. Preprocessing results in the base work, in digital form, being stored in the work in process subsystem 490.

During preprocessing, a human operator may select which frames should be included or excluded from further processing by the frame slicing and packaging machine. Frame selection criteria may include metadata as described below. The operator may be provided with options for frame selection, such as actors. For example, if the film Butch Cassidy and the Sundance Kid was being preprocessed, the operator could choose to process only the frames having video and/or audio of Butch Cassidy (played by Paul Newman), or only the frames showing his face.

Next, metadata is assigned to each frame of the digital video work (step 310). This may be performed by the frame metadata unit 410. The frame metadata may include an identification of the work, provenance of the work, an identification of the processor, and an identification of the frame within the work. The metadata may include: colors in the frame; tags previously assigned to the frame that describe the frame; and geographic location represented in the frame. The provenance of the work may include: the identity of the frame slicing and packaging machine; the geographic location and timestamp where the frame was originally produced or subsequently processed; names or other identification of the people, equipment and firms which did the production and processing; language and subtitles; details of how the production and processing were performed; and details of errors and errata from the production and processing. Metadata for a given frame may include a sequence of images from immediate prior and or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; studio.

Metadata for frames of still images may include: title or identify of the collection or sub-collection of which the image is a part; artist; subject; category; album; session; sequence; session index; sequence index; camera used; number of photographs in the album, session and or sequence.

Next, objects in each frame are detected (step 320). This may be performed by the object detection unit 420. The object detection step may include differentiation from a series of frames, for example using a Kalman filter on the images to recognize objects in motion.

Next, the detected objects are recognized (step 330). This may be performed by the object recognition unit 430. These objects may be recognizable generically or with varying specificity. For example, an object may be recognized generically as a person, or as a specific type of person (e.g., adult, child, male, female, star actor, extra), or as a specific person (e.g., Mae West or John F. Kennedy). Recognition of audio objects may include speech to text conversion. Frames may include text objects, such as signs or labels in an image.

Next, metadata is assigned to the recognized objects (step 340). This may be performed by the object metadata unit 440. This metadata may include the location in the frame of the object and recognition of the object (i.e., identification of what the object is). Location of the object in the frame may be, for example, X-Y coordinates, whether the object is in the frame's video or audio, bounding box coordinates (e.g. x0,y0,width,height), or foreground/background. The metadata may include an image of the object (e.g., an actor). The metadata of a person may include the actor's name. The metadata for audio objects may include spoken lines and sounds.

The metadata may link objects from within frames or across frames. For example, audio may be linked to the object in the image which produces the audio. In this way lines of dialogue may be linked to the actor speaking the lines. In this way, in Gone with the Wind, Rhett Butler (played by Clark Gable) may be linked to the line, "Frankly, my dear, I don't give a damn." Likewise, recitations of "May the Force be with you" in a Star Wars film may be linked to each actor reciting this line. Or, the sound of a gunshot may be linked to the image of the gun, or to a person struck, such as in the movie The Matrix, when Neo (played by Keanu Reeves) is shot.

Additional frame or object metadata may include whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Ariz., appearing in the frame; popular or famous objects, such as the Millennium Falcon, appearing in the frame; desired color composition appearing in the frame; quality of preservation or original source media, as whether it is deteriorated or is damaged; pre-existing value of adjacent segments or frames.

Next, for each frame, a cryptographic hash is generated of the frame's image, the frame metadata, and the object metadata (step 350). This may be performed by the hash unit 450, which encrypts information items about a frame along with the frame itself into a hash value that uniquely identifies the frame and information items about the frame. Thus, if even a single digital bit is changed in the files of the frame and information items about the frame that are input into the cryptographic hashing algorithm, the resulting hash value will be completely different from the hash value before the digital bit was changed. The hash unit 450 may produce a hash value from the representation of the image file along with the frame and object metadata. This hash value is more efficient and technologically superior to prior art index prints which aim to confirm that an individual print is part of a collection of prints shown in the index print.

The cryptographic hashing of the image from a frame with the metadata is performed to be able to objectively and transparently confirm authenticity of the image and the metadata into the future. This allows reliable chain of title and chain of custody and can support a reliable market for the image.

Next a watermark may be added to the hash (step 360) to protect the linkage of the image file with its hashed value from malicious tampering. This may be performed by the watermark unit 460. The watermark unit 460 packages the hash value with the corresponding frame.

Next, the watermarked hash is written to a node of a transaction processing network (step 370). This may be performed by the posting unit 470 by generating a transaction to register the watermarked hash along with its record provenance into a blockchain. Writing to the node may under control of a smart contract. The hash values provided by the hash unit 450, or the packages from the watermark unit 460, are recorded by the posting unit 470 into the transaction processing nodes 140, which may be in a secure transaction processing network, distributed ledger or blockchain, or other transaction processing environment. The distributed ledger may be an immutable distributed ledger.

The transaction processing nodes may support queries. Thus, an individual who might want to purchase an image could make a query to confirm the authenticity of the image. Each frame will have a different hash value—even hashes of the same frame will have different hash values.

FIG. 2 is a block diagram of a computing device 200. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 200 may be representative of the frame slicing and packaging machine 120 (FIG. 1). The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 220, storage 240, a network interface 260 and an I/O interface 280. The processor 210 may be or include one or more microprocessors, field programmable gate arrays (FPGAs), application specific integrated circuits (ASICs), programmable logic devices (PLDs) and programmable logic arrays (PLAs).

The memory 220 is a non-transitory storage medium and may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210. As used herein the term memory corresponds to the memory 220 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 240 provides non-volatile, bulk or long-term storage of data or instructions in the computing device 400. The storage 240 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. In some cases, such as those involving solid state memory devices, the memory 220 and storage 240 may be a single device.

The network interface 260 includes an interface to a network such as a network that can be used to communicate calls, signals, streams, arrays, flagged samples and feedback described herein. The network interface 260 may be wired or wireless.

The I/O interface 280 interfaces the processor 210 to peripherals (not shown) such as displays, video and still cameras, microphones, keyboards and USB devices.

In some cases, storage 240 is a non-volatile machine-readable storage medium that includes all types of computer readable media, including magnetic storage media, optical storage media, and solid state storage media. The software can be installed in the frame slicing and packaging machine 120.

The technologies described herein provide various technological improvements to computer performance and efficiency. For example, the frame slicing and packaging machine 120 has performance enhancements over the prior art that results in more efficient production of an inventory of image products from frames of a digital video work. For example, the technologies described are technological improvements over those of the past because they provide verifiable provenance of images of frames that have been extracted from a motion picture, short video such as a music video, video clip, movie trailer, or individual still photographs. It is believed that there is no mechanism in the prior art to extract individual frames and concurrent with the extract, provide proof of authenticity or provenance of the extracted frames and metadata about the extracted frames.

Within this description, the terms engine or machine means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed synthesis. The synthesis may be performed automatically using a synthesis tool. The gate netlist or other physical description may be further converted into programming code for implementing the engine in a programmable device such as PLD, FPGA or PLA. The gate netlist or other physical description may be converted into process instructions and masks for fabricating the engine within an ASIC.

Some technologies described for the frame slicing and packaging machine 120 and/or the computing device 200 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

Closing Comments

Throughout this description, the embodiments and examples shown should be considered as exemplars, rather than limitations on the apparatus and procedures disclosed or claimed. Although many of the examples presented herein involve specific combinations of method acts or system elements, those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a non-volatile machine readable medium storing a program having instructions which when executed by a processor will cause the processor to manufacture an inventory of image products from frames of a digital video work, each frame comprising a still image in sequence in the work, the digital video work including audio which corresponds to objects in the still images in the digital video work from which the audio is produced, the instructions of the program for:
   assigning metadata to each frame of the digital video work, the frame metadata including an identification of the work, provenance of the work, and an identification of the frame within the work;
   detecting objects in each frame's image;
   recognizing the objects;
   assigning metadata to the objects, including location in the frame and recognition of the object, the object metadata further linking spoken lines and sound in audio from the digital video work to the corresponding object in the frame's image which produces the spoken lines and sound;
   for each frame, generating a cryptographic hash of the frame's image, the frame metadata, and the object metadata;
   writing the hash to a node of a transaction processing network.

2. The apparatus of claim 1 further comprising extracting from a physical medium a sequence of analog form images and converting them to digital form.

3. The apparatus of claim 1 wherein the digital video work is a whole movie.

4. The apparatus of claim 1 wherein the digital video work is a portion of a movie.

5. The apparatus of claim 1 wherein at least one recognized object is at least one of a person, an animal and a good.

6. The apparatus of claim 5 wherein metadata of a person comprises an actor's name.

7. The apparatus of claim 1 wherein the frame metadata includes color compositions within the frame.

8. The apparatus of claim 1 wherein the frame metadata includes tags describing the frame's image, a geographic location where the frame's image was filmed, a geographic location of where the frame's image is represented to be in the work.

9. The apparatus of claim 1 wherein the frame includes audio, and the instructions are further for detecting objects in the frame's audio.

10. The apparatus of claim 9, wherein the metadata for audio objects includes spoken lines and sounds.

11. The apparatus of claim 1 wherein the transaction processing network is a blockchain ledger.

12. The apparatus of claim 1 wherein the hash is an individual file, such that there is one file produced from each frame of the digital video work.

13. The apparatus of claim 1 further comprising adding a watermark to the hash before it is written to the node.

14. The apparatus of claim 1 wherein at least some of the metadata links objects across frames.

15. The apparatus of claim 1 wherein at least some of the metadata links objects across frames.

16. A process for manufacturing an inventory of image products from frames of a digital video work, each frame comprising a still image in sequence in the work, the digital video work including audio which corresponds to objects in the still images in the digital video work from which the audio is produced, the process comprising:
   assigning metadata to each frame of the digital video work, the frame metadata including an identification of the work, provenance of the work, and an identification of the frame within the work;
   detecting objects in each frame's image;
   recognizing the objects;
   assigning metadata to the objects, including location in the frame and recognition of the object, the object metadata further linking spoken lines and sound in audio from the digital video work to the corresponding object in the frame's image;
   for each frame, generating a cryptographic hash of the frame's image, the frame metadata, and the object metadata;
   writing the hash to a node of a transaction processing network.

17. The process of claim 16 further comprising extracting from a physical medium a sequence of analog form images and converting them to digital form.

18. The process of claim 16 wherein the digital video work is a whole movie.

19. The process of claim 16 wherein the digital video work is a portion of a movie.

20. The process of claim 16 wherein at least one recognized object is at least one of a person, an animal and a good.

21. The process of claim 20 wherein metadata of a person comprises an actor's name.

22. The process of claim 16 wherein the frame metadata includes color compositions within the frame.

23. The process of claim 16 wherein the frame metadata includes tags describing the frame's image, a geographic location where the frame's image was filmed, a geographic location of where the frame's image is represented to be in the work.

24. The process of claim 16 wherein the frame includes audio, and the instructions are further for detecting objects in the frame's audio.

25. The process of claim 24, wherein the metadata for audio objects includes spoken lines and sounds.

26. The process of claim 16 wherein the transaction processing network is a blockchain ledger.

27. The process of claim 16 wherein the hash is an individual file, such that there is one file produced from each frame of the digital video work.

28. The process of claim 16 further comprising adding a watermark to the hash before it is written to the node.

* * * * *